July 24, 1962
A. H. EMERY
3,045,504
DEVICE FOR OVERCOMING A FALSE INDICATION DUE TO AN
ACTUAL LINEAR ERROR IN LEAD SCREW THREADS
Filed May 9, 1961
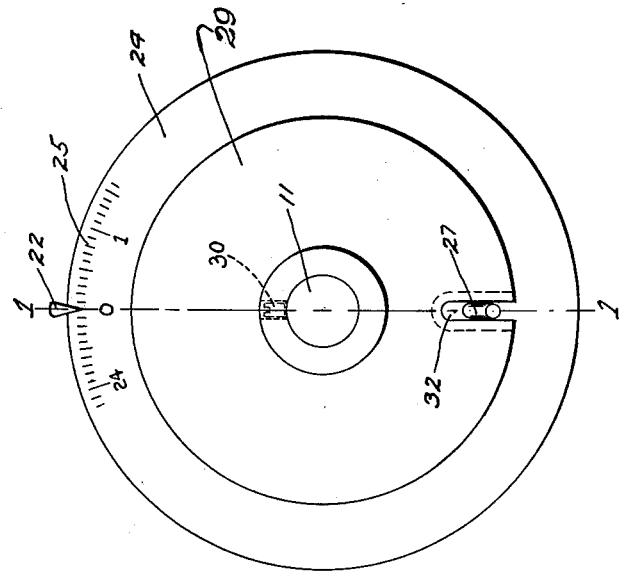
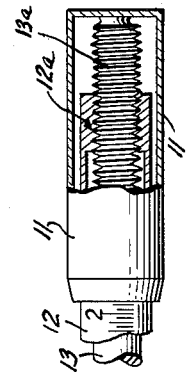
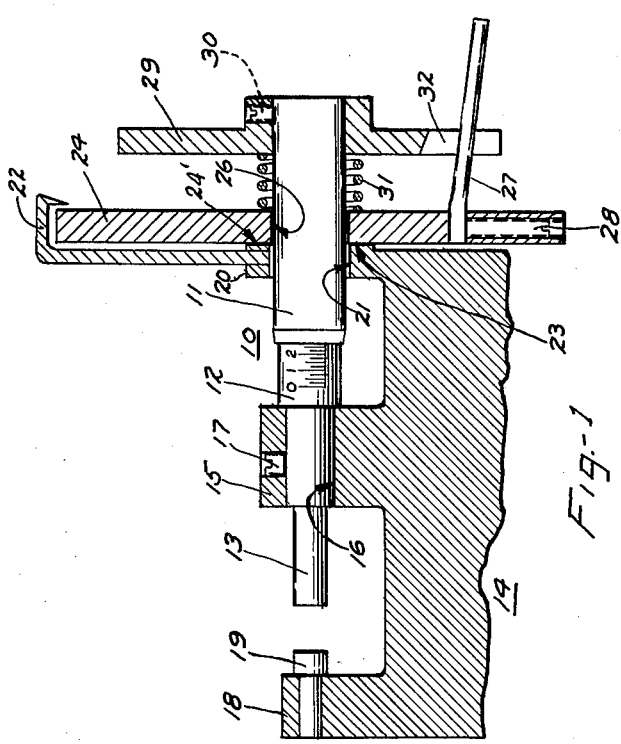
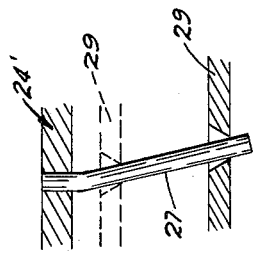
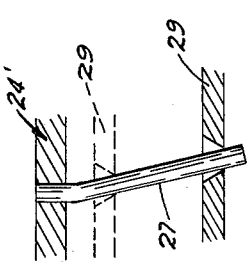
Alfred H. Emery
INVENTOR.
BY Carlton B. Fitchett
AGENT

United States Patent Office 3,045,504
Patented July 24, 1962

3,045,504
DEVICE FOR OVERCOMING A FALSE INDICATION DUE TO AN ACTUAL LINEAR ERROR IN LEAD SCREW THREADS
Alfred H. Emery, 624 Dutchess Turnpike, Poughkeepsie, N.Y.
Filed May 9, 1961, Ser. No. 108,932
6 Claims. (Cl. 74—424.8)

This invention relates generally to mechanisms having coacting parts moveable relative to each other by means of a lead screw threaded into a lead screw nut or body and including means indicating the axial position of the lead screw relative to the lead screw nut. In particular, the invention relates to a device for overcoming a false indication of the axial position of the lead screw relative to the lead screw nut due to an actual linear error in the lead screw threads.

The device comprises a driving means fixedly secured to the lead screw and slideably interconnected with a dial having indicia thereon, the interconnection providing a difference between the actual angle of rotation of the driving means and the responsive angle of rotation of the dial.

In general it is an object of the present invention to provide an improved lead screw driving device and associated indica means capable of overcoming a false indication due to a linear error which may have been developed in a lead screw thread during the manufacture thereof.

Additional objects and features of the invention will appear from the description thereof given below, but it will be understood that changes and alterations may be made in the exemplified structure within the scope of the appended claims.

In the accompanying drawing, I have illustrated one example of a physical embodiment of my invention.

In the drawing:

FIGURE 1 is a side elevational view in section, taken along line 1—1 of FIGURE 2, of a micrometer type gauge to which the device according to this invention has been applied;

FIGURE 2 is an end elevational view thereof;

FIGURE 3 is a somewhat enlarged detail view as seen from the top and partly in section, of an adjustably secured interconnection between the lead screw driving means and the indicia-bearing dial, the interconnection being rotated slightly counter-clockwise from its position as shown in FIGURES 1 and 2;

FIGURE 4 is a view similar to FIGURE 3 in which the interconnection has been rotated slightly clockwise; and FIGURE 5 is a side elevational view partly in section of the thimble-end portion of the micrometer generally indicated at 10 in FIGURE 1 with the thimble thereof broken away to show the details of the threaded interconnection between the lead screw and the lead screw nut of the micrometer.

As before noted, the illustrated embodiment of my invention includes a micrometer generally indicated at 10, having a thimble 11, barrel 12 and spindle 13. The micrometer 10 is of usual construction (see U.S. Patent No. 676,637, parts $b'$ $a^4$ and $b$, respectively) and is secured to a holding frame generally indicated at 14. The spindle 13 (see FIGURE 5) has a threaded part or lead screw 13a arranged axially within the barrel 12 and thimble 11 and, at its extreme inner end, is secured to the extreme inner end of the thimble 11. The barrel 12 has a portion 12a of its inside diameter threaded for cooperative engagement as a lead screw nut with the lead screw part 13a. A projecting part 15 of the frame 14 is bored as shown at 16 to a diameter providing a snug fit with a portion of the outside of the micrometer barrel 12 and the same is secured therein by means such as screw 17.

A second projecting part 18 of the frame 14 is adapted as shown at 19 to serve as an anvil in axial alignment with the bore 16.

A third projecting part 20 of the frame 14 is bored as shown at 21 in axial alignment with bore 16 to a diameter sufficient to provide clearance with the outside diameter of the micrometer thimble 11 which extends outwardly to the right therethrough in the illustrated embodiment. The projecting part 20 may also serve as a rigid mounting means for the pointer 22. In addition, the part 20 is provided with an outwardly extending flange having a face 23 normal to the aligned bores 16 and 21.

From the arrangement described thus far, it will be understood that the central longitudinal axis of the micrometer moving parts, that is, the rotatable thimble 11, and the axially extending and retracting spindle 13, is in common with the central longitudinal axis of the fixed micrometer barrell 12 and the fixed anvil 19 as well as the bores 16 and 21. It will be further understood that the face 23 is normal to the common longitudinal axis of the above noted parts.

A dial 24 having suitable indicia thereon adjacent the periphery of one side or face as indicated at 25, is centrally bored at 26 to a diameter providing a sliding fit with the outer periphery of the micrometer thimble 11, and arranged about the same with the other side or face of the dial abutting the face 23 of frame 14. The abutting area of the said other side of the dial 24 is provided with a surface 24' normal to the bore 26 and, accordingly, when the dial 24 is arranged about the thimble 11, the surface 24' is normal to the above mentioned common longitudinal axis. The dial 24 also carries a pin 27 projecting from the indicia bearing face thereof with its central longitudinal axis at a slight angle when considered with the central longitudinal axis of the micrometer, and the pin 27 is secured thereto by means such as screw 28.

The micrometer thimble 11 is fitted with an operating hand wheel 29 having substantially parallel sides or faces and is secured thereto as by means of screw 30. A thrust spring 31 of the compression type encircles the thimble 11 between the adjacent faces of the handwheel 29 and the dial 24 and holds the surface 24' of the latter against the face 23 on frame 14. The handwheel 29 is provided with a slot 32 opening radially inward from the wheel periphery. The walls defining the slot 32 preferably are tapered so that the width of the slot in one face of the handwheel provides a sliding fit with pin 27 and the width of the slot in the other face of the handwheel provides considerable clearance with the pin. In the embodiment shown in FIGURES 2, 3 and 4 the width of the slot at the outer face of handwheel 29 is such that it provides a sliding fit with pin 27 received therethrough while the slot width at the face adjacent the dial 24 provides considerable clearance with the pin 27 (see FIG. 3).

The pin 27 thus provides an interconnection between the lead screw driving means (the handwheel 29 secured to the micrometer thimble 11 which, in turn, is secured to the lead screw 13a as shown in FIGURE 5) and the dial 24. As shown considerably exaggerated in FIGURES 1 and 3, the pin 27 in the illustrated embodiment is bent at one point with regard to its central longitudinal axis. Accordingly, if the so bent pin 27 is secured in dial 24 with its central longitudinal axis and the central longitudinal axis of the micrometer parts 11, 12 and 13 in a common plane (see FIGS. 1 and 2), there will be no difference in the total angular rotation imparted to dial 24 by handwheel 29 via the pin 27. However, should the bent pin 27 be secured in dial 24 so that the above noted axes are not in a common plane (see FIGS. 3 and 4 as viewed from the top), a continuously decreasing total angular rotation will be imparted to dial 24 by handwheel 29 via the pin 27.

If the total lead screw error of the micrometer lead screw 13a between its maximum retracted and extended positions when measured by gauge blocks and compared with the indicia reading indicated by dial 24 is found to be positive, then the pin 27 should be secured in dial 24 with the bend positioned as shown in FIGURE 3. On the other hand, should the total lead screw error be determined by the same comparative means to be minus, then the pin 27 should be secured in dial 24 with its bend positioned as shown in FIGURE 4.

In the arrangement according to FIGURE 3, the handwheel 29 is ahead of the dial 24 speaking in terms of angular rotation when the micrometer spindle 13 is fully retracted. In the arrangement according to FIGURE 4 the reverse situation is had. Thus, as the handwheel is turned and the spindle 13 moves in the direction of anvil 19 to its fully extended position and, in turn, the handwheel 29 moves axially toward the dial 24 to the dotted position shown in FIGURES 3 and 4, the rate of change of relative angular rotation between the wheel 29 and dial 24 will decrease uniformly.

Since any linear lead screw error is cumulative at a uniform rate of change between the extreme ends of the same, the interconnection (pin 27) between the micrometer lead screw driving means according to this invention (handwheel 29) and the associated indicia bearing dial 24 freely carried on the thimble 11 affixed to the lead screw as hereinbefore described, provides a means for overcoming this error.

In actual practice, when the device according to this invention is to be utilized to overcome a false indication due to linear error in lead screw threads per se, the maximum linear error between the extreme ends of the lead screw travel as measured by gauge blocks and any difference therefrom as indicated by the instrument indicia per se is determined. Then the lead screw is moved to its fully retracted position and pin 27 of the device is set and secured by its securing means 28 so that the handwheel 29 which physically drives the lead screw is ahead of or behind the relative position of the dial 24 with regard to angular rotation to an extent that the total lead screw linear error is overcome when the lead screw is moved to its fully extended position. Since, as before noted, the linear lead screw error varies at a uniform rate of change of angular rotation, and further, since the interconnection provided in the lead screw driving means according to this invention provides a similar counter uniform rate of change of angular rotation, the actual position of the lead screw as indicated by the indicia per se had been made true.

I claim:

1. In a mechanism including a threaded lead screw, a coacting threaded lead screw nut, and indicia means in operative connection with the lead screw for indicating the extent of axial movement of the lead screw relative to the lead screw nut, a device for eliminating the inclusion of linear error present in the lead screw threads by the indicia means which includes, in combination, a lead screw driving means fixedly secured to the lead screw and having a radial slot defined therein, an indicia means freely supported coaxially about the lead screw substantially adjacent to but spaced apart from the driving means, and a mechanical interconnection between the indicia means and the driving means, the interconnection comprising a pin adjustably secured to the indicia means with its central longitudinal axis not parallel to the central longitudinal axis of the lead screw, the pin extending from the indicia means to the said slot and being received therein with a sliding fit, the angle between the said longitudinal axes being determined relatively with respect to the actual linear error in total length of the lead screw thread and to the distance the adjacent faces of the driving means and the indicia means are spaced apart.

2. A device according to claim 1 in which the driving means is a handwheel having substantially parallel sides with the radial slot defined therein having tapered sides of a width at the opening on one side of the wheel dimensioned to provide a sliding fit with the pin.

3. A device according to claim 1 in which the indicia means freely supported coaxially about the lead screw is spaced apart from the secured driving means by a compression spring arranged between the adjacent sides of the said indicia means and the said driving means.

4. A device according to claim 1 in which the mechanism including the lead screw is supported in a frame, the frame having a part thereof encircling the lead screw, said encircling part having a face thereon normal to the central longitudinal axis of the lead screw.

5. A device according to claim 1 in which the mechanism including the lead screw is supported in a frame, the frame having a part thereof encircling the lead screw with a face thereon normal to the central longitudinal axis of the lead screw, the indicia means also having a surface on its side adjacent to the said face normal to the said axis, the said face and the said surface being held in contact by a compression spring arranged between the freely supported indicia means and the secured driving means.

6. A device according to claim 1 in which the adjacent faces of the freely supported indicia means and the secured driving means when the lead screw is fully retracted are spaced apart a distance equivalent to the total axial movement of the lead screw along its central longitudinal axis between its fully retracted and its fully extended position.

References Cited in the file of this patent

UNITED STATES PATENTS

| 226,162 | Darling | Apr. 6, 1880 |
| 676,637 | Spalding | June 18, 1901 |
| 2,897,464 | Miller | July 28, 1959 |

FOREIGN PATENTS

| 487,247 | France | Mar. 26, 1918 |